United States Patent
Smith

(10) Patent No.: US 7,644,559 B2
(45) Date of Patent: Jan. 12, 2010

(54) SELF-THREADING SHEET WRAPPER FOR ROUND BALER

(75) Inventor: Kevin M. Smith, Narvon, PA (US)

(73) Assignee: CNH America LLC, New Holland, PA (US)

(*) Notice: Subject to any disclaimer, the term of this patent is extended or adjusted under 35 U.S.C. 154(b) by 0 days.

(21) Appl. No.: 11/957,049

(22) Filed: Dec. 14, 2007

(65) Prior Publication Data

US 2008/0092489 A1     Apr. 24, 2008

Related U.S. Application Data

(62) Division of application No. 11/242,775, filed on Oct. 4, 2005, now Pat. No. 7,334,382.

(51) Int. Cl.
*B65B 63/04* (2006.01)

(52) U.S. Cl. .......... 53/430; 53/118; 53/389.2; 242/555.3; 242/559

(58) Field of Classification Search .......... 53/118, 53/211, 389.2, 430, 587; 242/555, 555.3, 242/558, 559.2, 559
See application file for complete search history.

(56) References Cited

U.S. PATENT DOCUMENTS

| | | | | |
|---|---|---|---|---|
| 2,549,912 A | * | 4/1951 | Lindsay | 242/559.2 |
| 3,022,022 A | * | 2/1962 | Freeman | 242/422.9 |
| 3,172,613 A | * | 3/1965 | Simons et al. | 242/555.6 |
| 3,570,779 A | * | 3/1971 | London | 242/533.5 |
| 3,825,201 A | * | 7/1974 | Osta | 242/554.3 |
| 4,466,577 A | * | 8/1984 | Heinz et al. | 242/559.2 |
| 5,676,792 A | * | 10/1997 | Cairns | 156/502 |
| 5,833,168 A | * | 11/1998 | Tahata et al. | 242/559.2 |
| 5,849,123 A | * | 12/1998 | Rice | 156/64 |
| 6,247,291 B1 | * | 6/2001 | Underhill | 53/118 |
| 7,356,981 B2 | * | 4/2008 | McClure et al. | 53/587 |

* cited by examiner

*Primary Examiner*—Thanh K Truong
(74) *Attorney, Agent, or Firm*—Patrick M. Sheldrake; John William Stader; Michael G. Harms

(57) ABSTRACT

A round bale wrapping mechanism that employs a pivoting carrier for two wrapping material rolls, one a stored roll and the other the working roll being dispensed. When the storage roll is to be employed, it is pivoted into contact with the material being dispensed from the working roll and pulled through the threading components of the wrapper. The storage roll thus becomes the working roll and a new storage roll may be installed in place of the empty storage roll (previously the working roll).

9 Claims, 7 Drawing Sheets

SELF-THREADING SHEET WRAPPER FOR ROUND BALER

This divisional application claims priority under 35 U.S.C. § 120 from U.S. patent application Ser. No. 11/242,775 filed on Oct. 4, 2005 now U.S. Pat. No. 7,334,382 by Kevin M. Smith with the same title, the full disclosure of which is hereby incorporated by reference.

BACKGROUND OF THE INVENTION

The present invention relates generally to round balers with net-wrapping capabilities, and more particularly to a net wrapping mechanism for a round baler that self-threads a new roll of wrapping material as the initial roll is consumed.

In the crop packaging industry, generally a smaller part of the cattle/dairy industry, round balers have become quite prevalent for their capability of producing a conveniently sized cylindrical bale, very often automatically wrapped with a sheeting material such as net or film. Prior art round balers generally have a bale-forming chamber defined by an apron comprising an array of side-by-side belts, transverse slats trained on chains, a plurality of rolls or a combination of these various elements, e.g., rolls and belts. Crop material, such as hay, is picked up from the ground as the baler travels across the field, and is fed into a fixed or expandable chamber where it is rolled up to form a compact cylindrical hay package. While still inside the bale-forming chamber in its compacted form, the outer surface of the package is wrapped with twine or other wrapping material, such as film or net, prior to ejection of the wrapped bale from the chamber onto the ground for subsequent handling. The wrapping mechanisms generally dispense wrapping material from a roll, and have a location for a stored roll, but in order to use the stored roll, the operator must stop the machine and manually load and thread the second roll.

Common practice has the baler wrap the bales with twine, net-like or continuous plastic sheeting. With twine, the bale is wrapped back and forth from side-to-side as the bale is turned, from a single dispensing mechanism, or back and forth from middle-to-side as the bale is turned, from dual dispensing mechanisms with twine numerous time, the twine "gripping" the crop material and prior wrappings of twine adequately to hold the package together in a process often referred to as "tying". Net wrap is made of a an extruded polymer with the appearance of a fish net, generally equal in width to the bale being formed, with regular openings therethrough and is overlapped on itself to hold the package together. An adhesive may be used to improve the holding power of the net wrap. Plastic wrap, or film, is a generally continuous sheet of plastic, also generally the width of the bale being formed, with a somewhat adhesive surface that grips itself when overlapped and the crop material to form the package.

Replacing a sheet roll on current round balers generally requires a substantial amount of work. First, the operator must remove the empty roll and carry a full roll from the storage box to the wrapper assembly in the front of the baler. After installing the full roll into the wrapper assembly, the operator must thread the end of the roll around spreader rolls and through the duckbill, or similar, assembly. The process takes an experienced operator about five minutes, and would be done once or twice during a normal baling day. While this amount of time is small, any improvements made to this reloading cycle will help reduce operator fatigue and stress, and as such will offer significant marketing advantage over competitive units.

It would be a great advantage to provide a self-threading capability to a round baler wrapping mechanism that overcomes the above-identified problems and disadvantages.

SUMMARY OF THE INVENTION

Accordingly, it is an object of the present invention to provide an improved round bale wrapping mechanism that avoids the above-noted disadvantages.

It is another object of the present invention to provide a round bale wrapping mechanism that provides storage for a second roll of wrapping material, in addition to a roll being dispensed.

It is a further object of the present invention to provide a round bale wrapping mechanism that is self-threading, allowing the operator to replace a roll of sheet wrapping material with a minimal amount of work.

It is a further object of the present invention to provide a round baler net wrapping mechanism that carries two rolls of wrapping material on a pivoting carrier that pivots down for installation of a new storage roll, allowing the operator to install the roll at a lower more convenient height.

These and other objects are achieved by providing a round bale wrapping mechanism that employs a pivoting carrier for two wrapping material rolls, one a stored roll and the other the working roll being dispensed. When the storage roll is to be employed, it is pivoted into contact with the material being dispensed from the working roll and pulled through the threading components of the wrapper. The storage roll thus becomes the working roll and a new storage roll may be installed in place of the empty storage roll (previously the working roll).

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
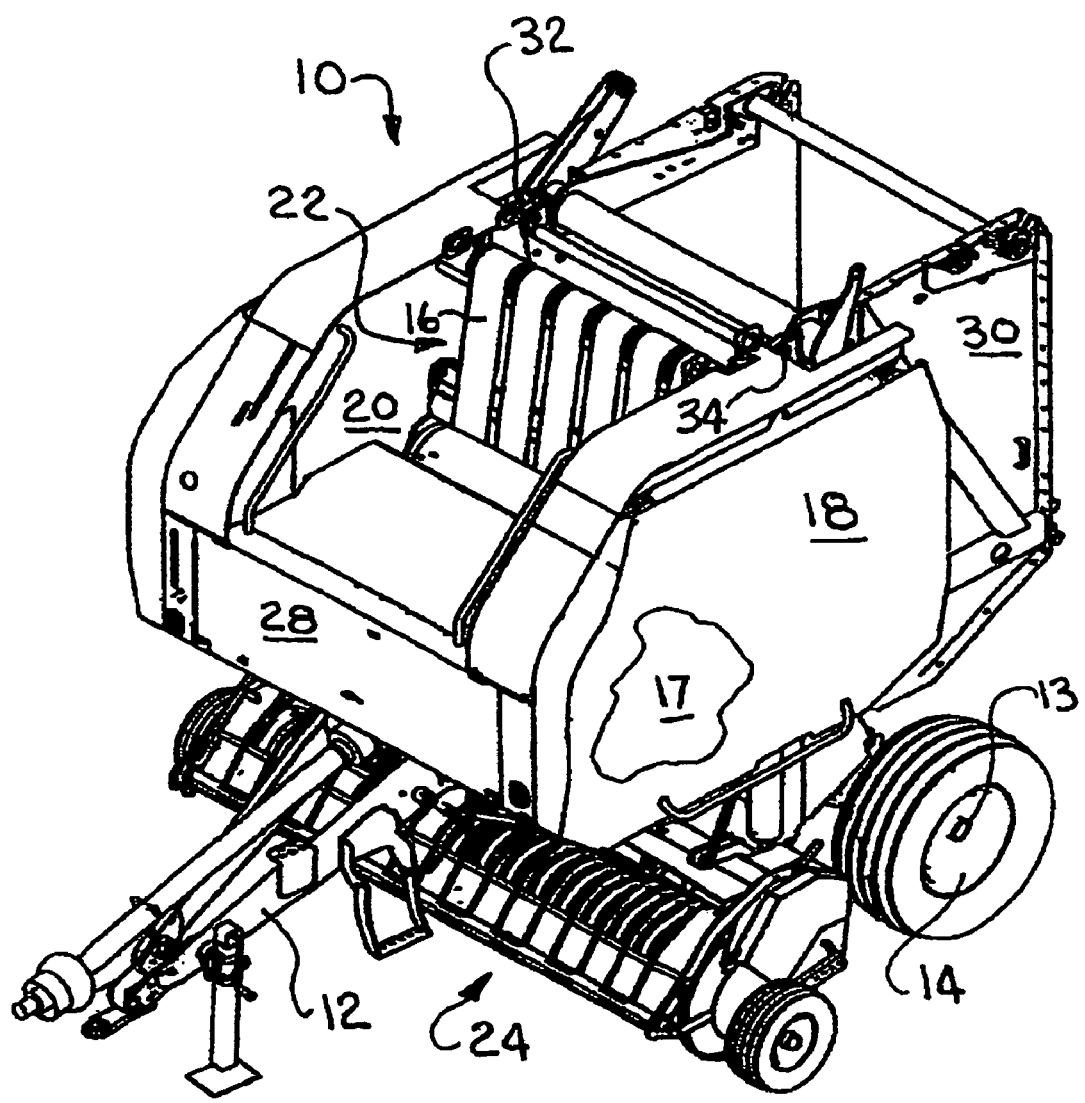
FIG. 1 is a diagrammatic overview of a round baler of the type which could employ the apparatus of the instant invention.

Referring to FIG. 1, a generally well-known round baler 10, with which the bale wrapper of the present invention can be used, is shown to comprise a main frame terminating forwardly in a tongue 12 and rearwardly slightly beyond a transverse axle 13 to which a pair of wheels 14 (only one shown) are mounted—thus forming a wheel supported main frame (not shown in detail). The main frame supports a series of belts 16 and rolls (not shown) which together with a first sidewall 17 (shown in the breakout) behind and generally parallel to cover panel 18 and a second sidewall 20, all together establishing a bale-forming chamber 22. Cut crop material is picked up by transverse pickup 24 and fed into bale-forming chamber 22 where it is, as discussed above, formed into a cylindrically shaped bale. It is then wrapped with twine or a wrapping material dispensed from a wrapping mechanism generally behind shield 28. Upon completion of the wrapping process, the tailgate 30 pivots upwardly about pivot points 32, 34, and the bale is ejected onto the ground. Exemplary prior art wrapping mechanisms are shown in U.S. Pat. Nos. 4,366,665; 4,790,125; and 4,956,968.

Figure 2:
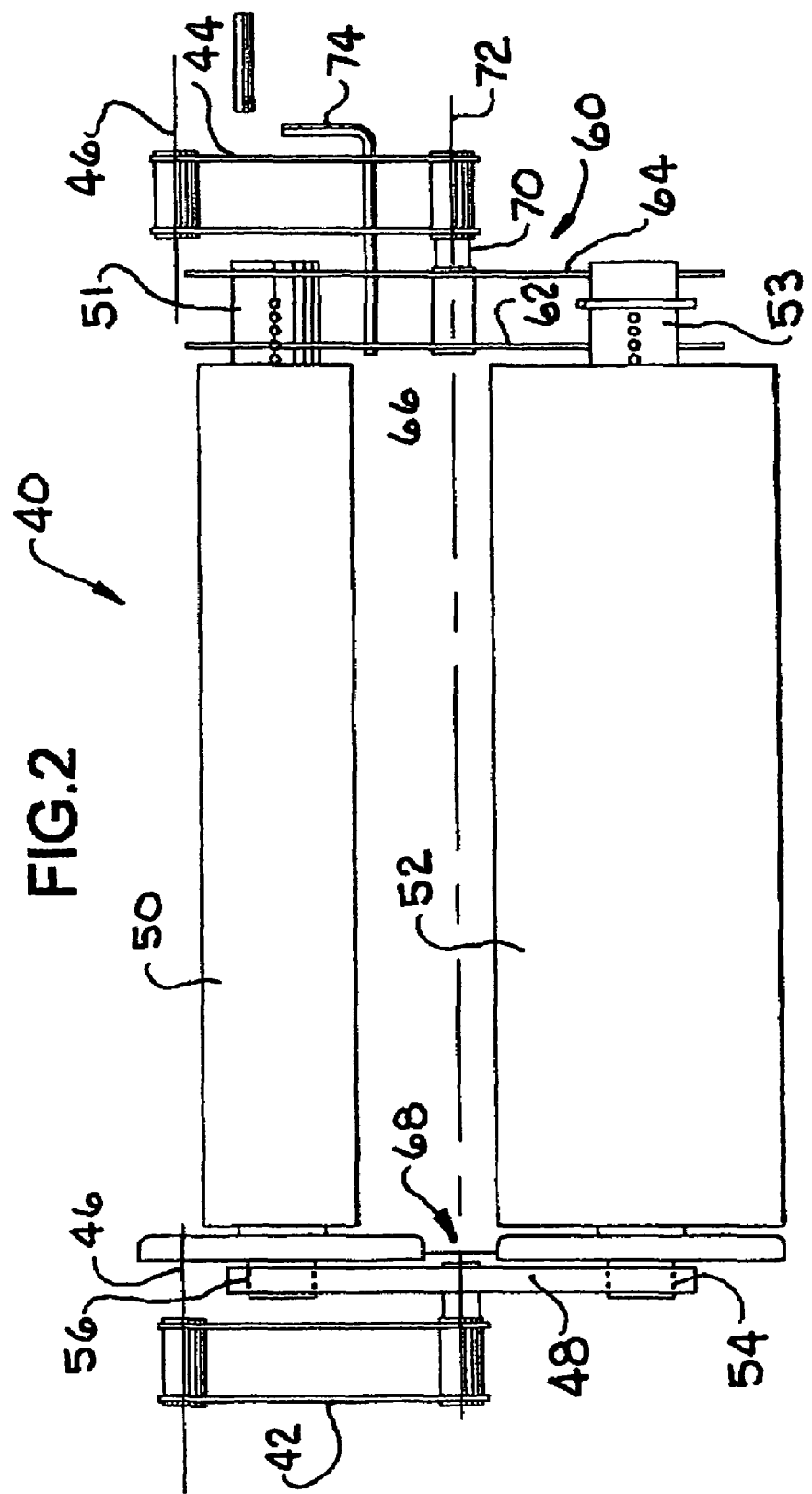
FIG. 2 is front plan view of the sheet wrapper, showing the various components.

The wrapping material can, as previously mentioned, be either net wrap or a generally solid film, though, because net wrap is the preferred material, further description will refer primarily to net wrap or net roll. This mechanism does not handle twine. FIG. 2 is a front view of the general roll supporting structure. A two-roll carrier 40 is hung on two pivot links 42, 44 attached with pivot pins for movement about a pivotal axis 46 to baler frame components, such as sidewalls 17 and 20. Carrier 40 is comprised of an elongate right end plate 48 slightly longer than the distance between the longitudinal axis of the two net rolls 50 and 52, and having holes therethrough 54, 56. A left end plate or roll-holding attachment 60 comprises a pair of plates 62, 64 held in spaced-apart relationship by hollow tubular section 66. Toward the outer ends of plates 62, 64 there are located holes, similar to those through right end plate 48. Carrier 40 further includes two shafts 51, 53 onto which the two net rolls 50, 52 slide for positional support. Holes 54, 56 are large enough relative to shafts 51, 53 to allow relative rotation of the shafts within the holes. Shafts 51, 53 could be removably mounted in several different ways, the figures depicting shafts that are inserted through holes, with means to maintain them in position—such as holes and cotter pins. Additionally, the right end plate is rotatably pinned to the pivot link 42 by removable pin 68, and the left end plate is rotatably affixed to pivot link 44 by removable pin 70 for rotation about axis 72. Thus, the two net rolls are supported between the right and left end plates and may selectively, as to be discussed further below, pivot about axis 72 and axis 46. A lock pin 74 extends through openings in both the pivot link 44 and left support plate 60. When in the position shown in FIG. 2, lock pin 74 prevents rotation of the rolls about axis 72 during operation. As one of skill in the art would readily appreciate, the mechanism may include adjustment features that accommodate net rolls of different diameters.

Figure 3:
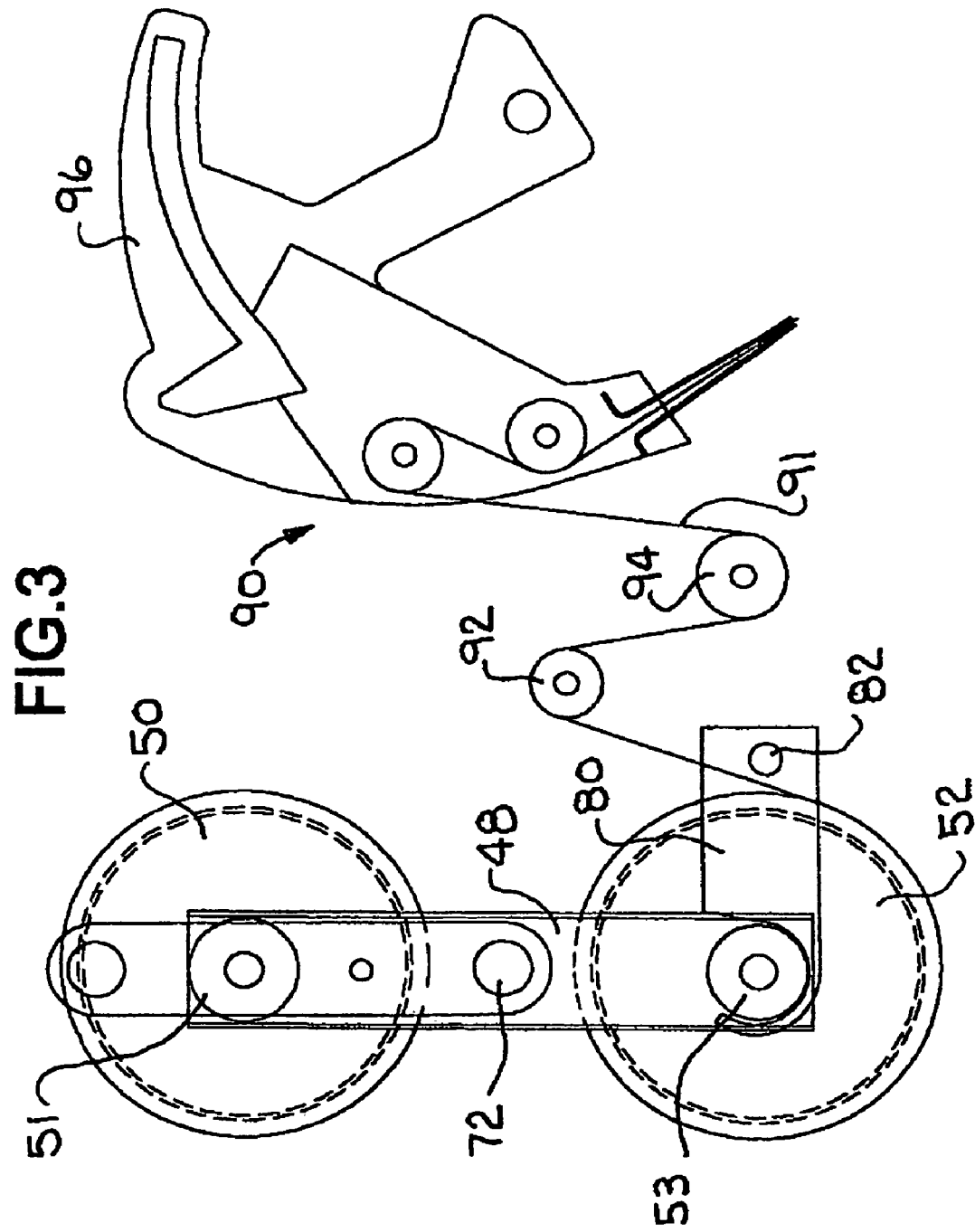
FIG. 3 is a left-side elevation view of the wrapper mechanism, spreader rolls and duckbill.

In normal operation, FIG. 3, the lower roll 52 on the carrier is the active roll, feeding net into the baler, while the upper roll is in the storage position. Hook-shaped latch 80 pivots about point 82 to engage or disengage from the end of the active roll.

When engaged, latch 80 secures the net carrier to the frame of the baler. FIG. 3 further depicts a current structure 90 for feeding net wrap 91 onto a bale. The net feeds off the roll 52, is threaded over spreader rolls 92, 94 and into billhook assembly 96. From the billhook, the net is fed onto the rotating bale for complete wrapping.

Figure 4:
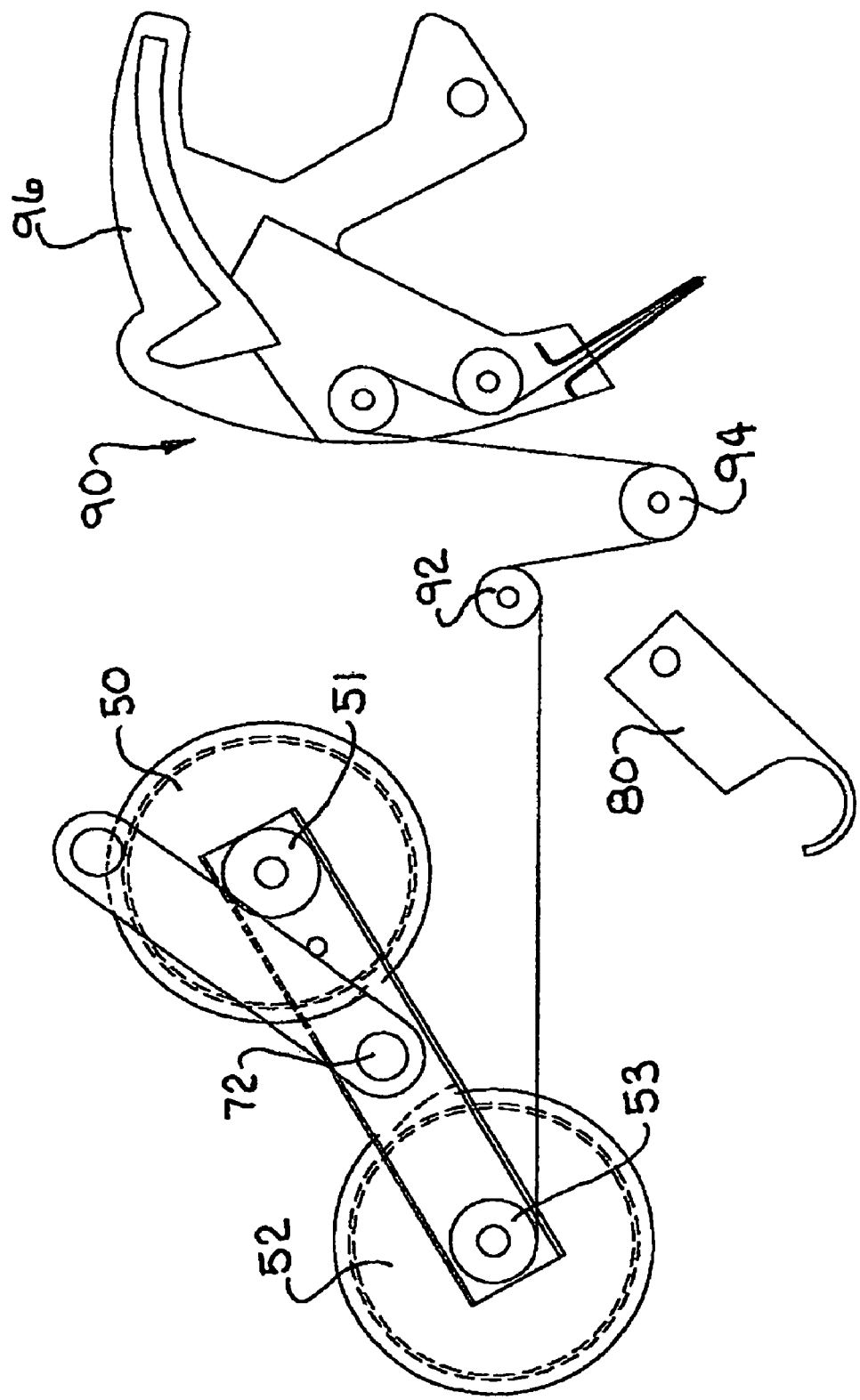
FIG. 4 is a left-side view, similar to FIG. 3, showing the storage rolling intermediate the storage position and the self-threading position.

When using the self-threading feature of this new design, the active roll is rotated to the top position and the stored roll drops to the lower position. This is accomplished by first releasing lock pin 74 and latch 80, allowing the pivot links 42, 44 to swing forward and the net carrier to pivot about axis 72 as shown in FIG. 4. Since the pivot links 42, 44 swing forward, the top roll essentially drops straight down. This motion is required to eliminate any interference with the spreader rolls 92, 94.

Figure 5:
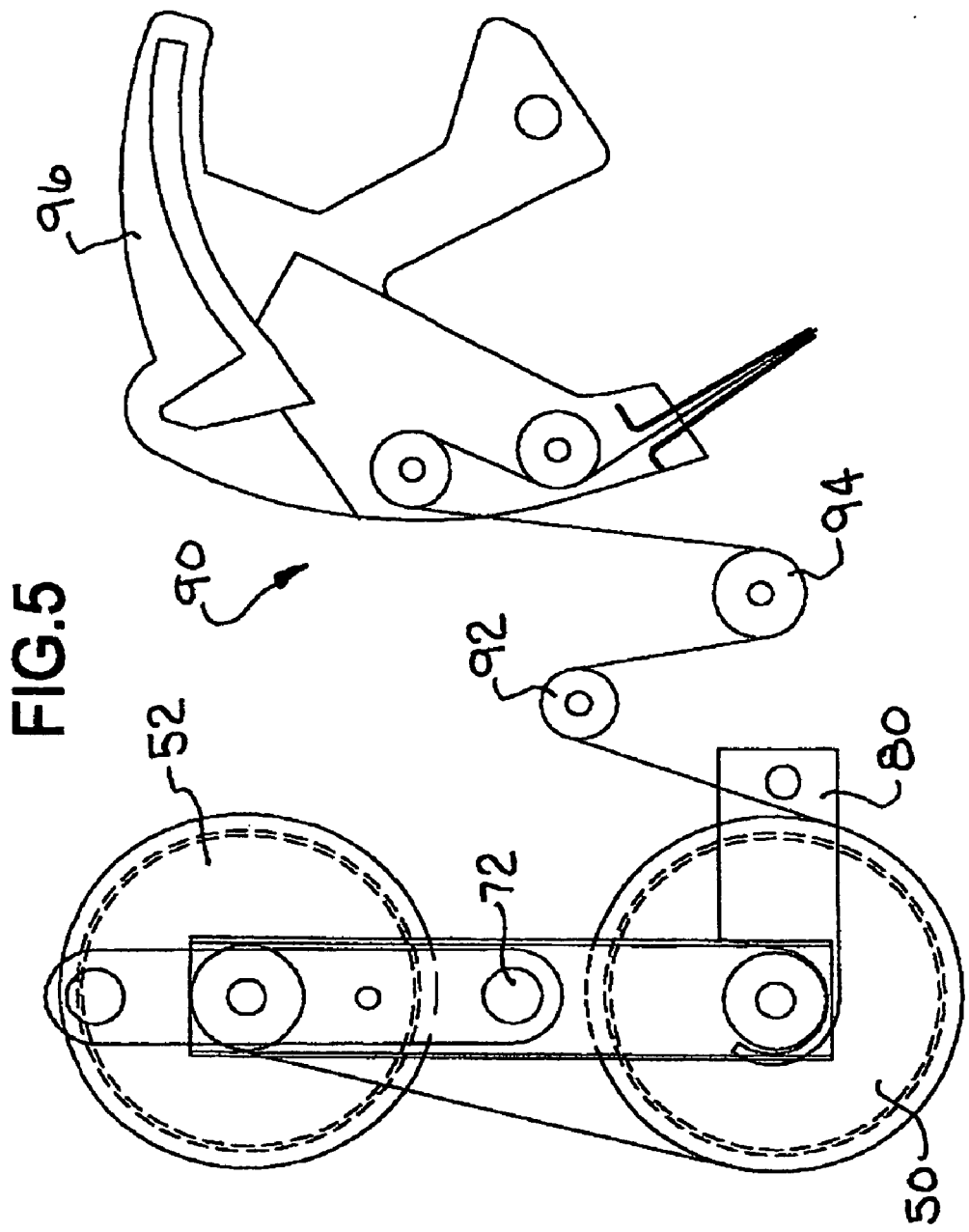
FIG. 5, similar to FIG. 4, shows the storage roll in the self-threading position.

When the rolls are in the self-threading position, the net from the top roll 50 wraps around the bottom of the lower roll 52 which is reaching the point of exhaustion as seen in FIG. 5. When wrapping the next bale, the net movement causes the lower roll to start rotating. The end of the net on the lower roll attaches itself to the upper roll net and is carried through the duckbill assembly and onto the bale. Ideally, when using the self-threading feature, the active roll should be nearly empty (generally, enough wrap left to cover one bale) to avoid installing net from both rolls for multiple bales.

Figure 6:
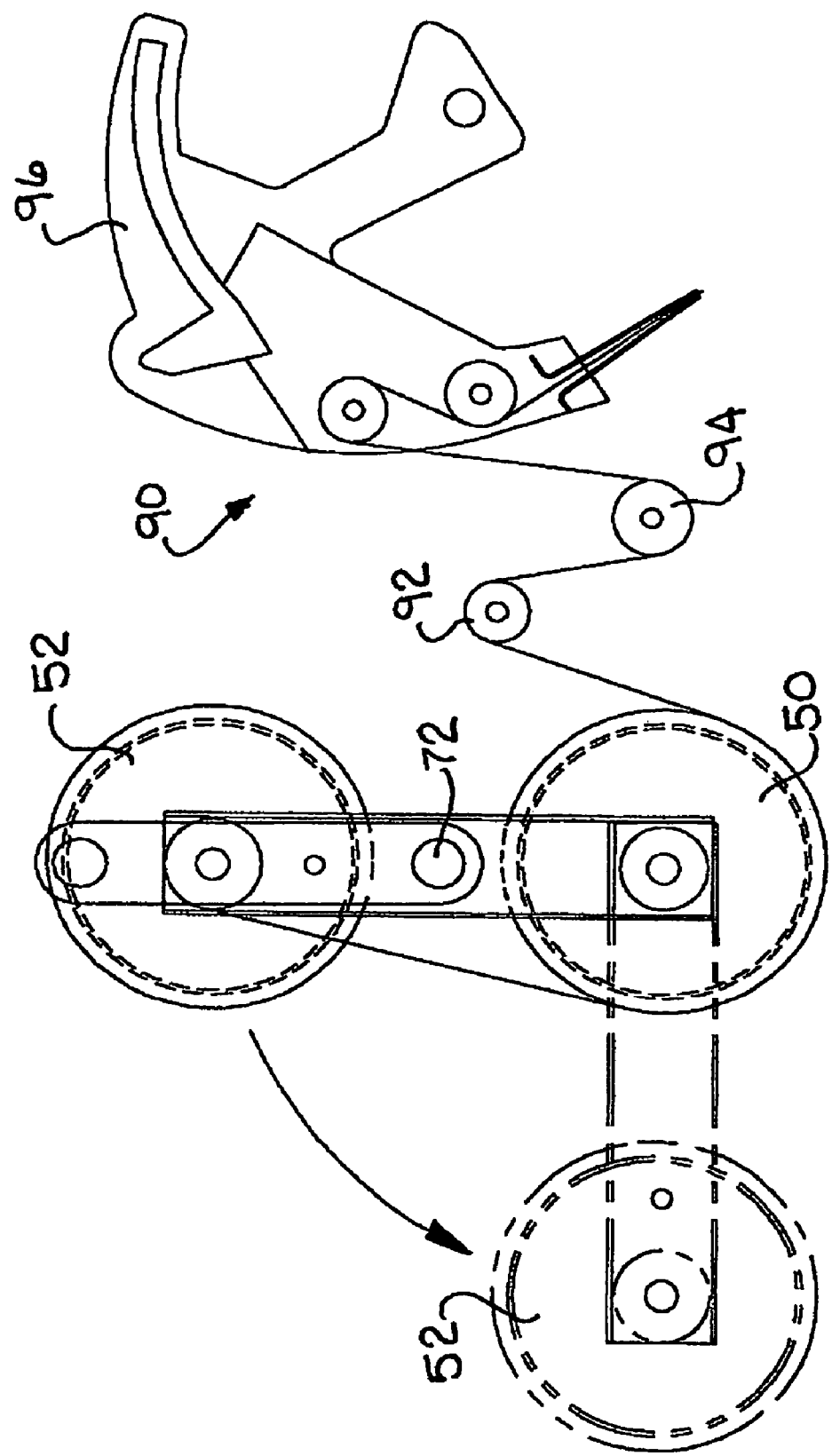
FIG. 6, similar to FIG. 5, shows the carrier in the roll-loading position.

After completing the self-threading process, the upper roll will be empty and again the lower roll will become the active roll. In this situation, the operator will be able to replace the empty roll with a new roll of net. To do this, the operator needs to disengage the pins 68 and 70 connecting net roll carrier 40 to pivot pins 42, 44. When this is done, carrier 40 will pivot forward about the lower net roll longitudinal axis as in FIG. 6. This motion does not affect the lower active net roll. Once pivoted forward, a new net roll can be installed, and the carrier returned to normal operating condition.

Figure 7:
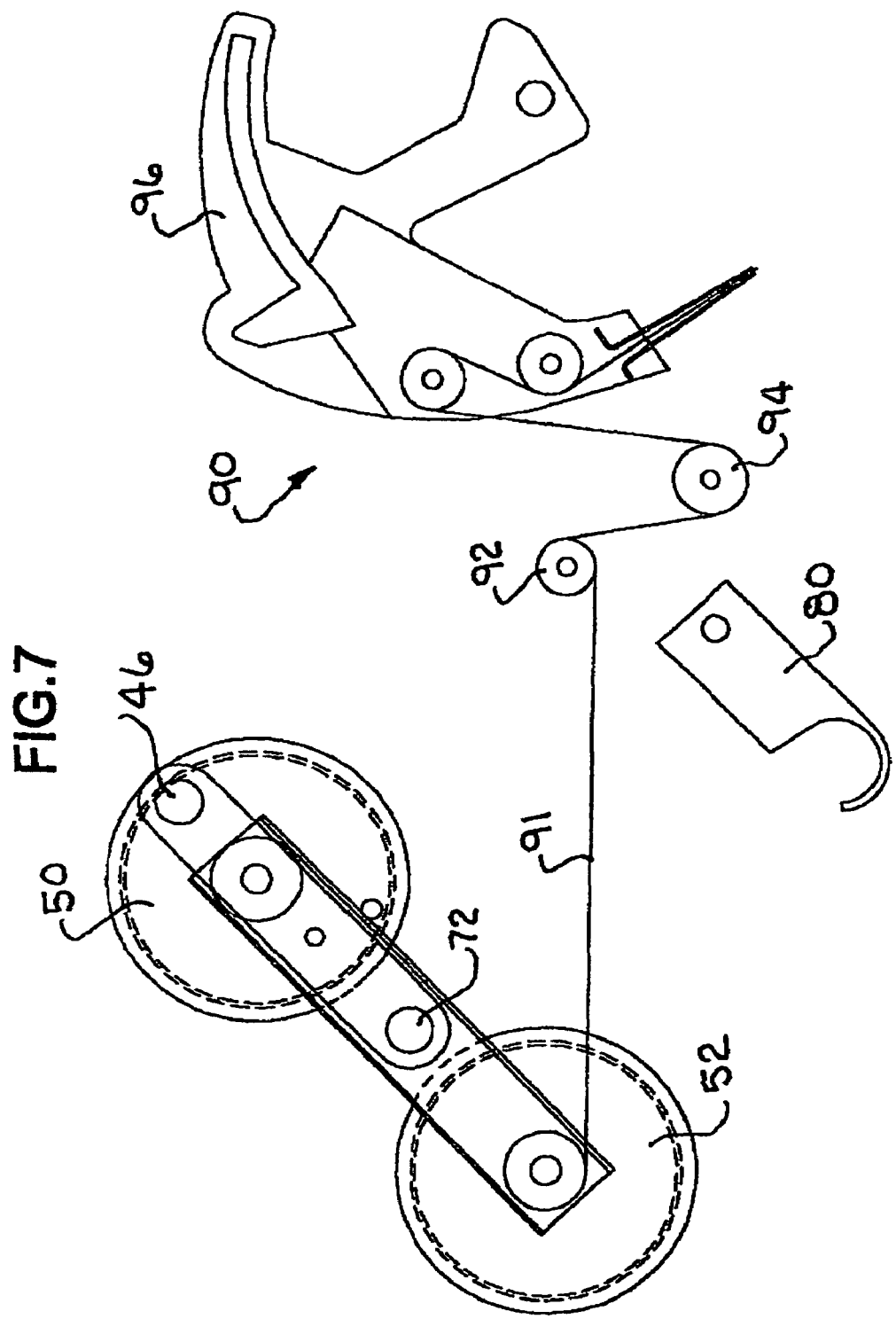
FIG. 7 shows the roll carrier in the manual threading position.

Another position of the carrier is the manual threading position shown in FIG. 7. This position would be used to allow access to the duckbill assembly, or to manually rethread the net due to a wrapper malfunction. To move to this position, the operator must release latch 80. This allows the net carrier 40 to pivot about 46. Pulling on the lower roll rotates the carrier 40 forward and upward, allowing access to the wrapping mechanism 90. In order to hold carrier 40 in this position, a support (not shown) could be engaged by the operator. When work on the wrapper is completed, the support can be removed and the carrier will return to the normal operating position.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. For example, left end plate 60 is shown as comprising two members 62, 64. Clearly, this member could be modified slightly to be a single plate, much like right end plate 48. Accordingly, the following claims are intended to protect the invention broadly as well as in the specific form shown. Furthermore, for example, the preferred embodiment of the roll carrier supports two rolls, one active and one storage, however, it is possible to have three or more rolls arranged to move in a generally circular path. In such case, one would be active, with the remainder as storage. Obviously, the carrier would have to be modified to hold the additional rolls, as would the size of the holder.

What is claimed is:

1. A method of self-threading a bale wrapping material from a roll through a bale wrapping mechanism, comprising the steps of:
   providing an active roll of bale wrapping material in a first location and feeding it along a predetermined path through the bale wrapping mechanism;
   providing a storage roll of bale wrapping material in a second location parallel to the active roll, the first and second locations oriented vertically on opposing sides of a pivot axis of a carrier that supports the rolls;
   observing the active roll to determine when it is nearly exhausted of wrapping material, and, when that condition is observed:
   moving the storage roll from the second location to the first location into contact with the bale wrapping material along the predetermined path into the same first location previously occupied by the active roll, so that the wrapping material on the storage roll adheres to and follows the wrapping material from the active roll being fed along the predetermined path;
   moving the active roll in co-ordination with the movement of the storage roll from the first location to the second location.

2. The method of claim 1, further including the step of:
   locking the storage and active rolls in relative position, such that the storage roll becomes the active roll as the active roll is exhausted of wrapping material.

3. The method of claim 2, further including the step of:
   replacing what was initially the active roll with a new roll of bale wrapping material.

4. The method of claim 3, wherein:
   the bale wrapping material comprises netwrap.

5. The method of claim 4, wherein:
   the bale wrapping material is a film.

6. The method of claim 1, wherein the first active roll continues to dispense wrapping material along the predetermined path upon reaching the second location previously occupied by the supply roll.

7. The method of claim 1, wherein the second location is located above the first location, such that the storage roll is rotated downwardly about the pivot axis of the carrier from the second location to move into contact with the bale wrapping material along the predetermined path and into the lower first location.

8. A method of self-threading a bale wrapping material from a roll through a bale wrapping mechanism, comprising the steps of:
   providing an active roll of bale wrapping material in a first location and feeding it along a predetermined path through the bale wrapping mechanism;
   providing a storage roll of bale wrapping material in a second location parallel to the active roll;
   observing the active roll to determine when it is nearly exhausted of wrapping material, and, when that condition is observed:
   moving the storage roll from the second location to the first location into contact with the bale wrapping material along the predetermined path so that the wrapping material on the storage roll adheres to and follows the wrapping material from the active roll being fed along the predetermined path;
   moving the active roll in co-ordination with the movement of the storage roll from the first location to the second location; and
   wherein the storage roll is moved from the second location to the first location by pivoting a roll carrier adapted to receive and rotatably hold opposing ends of the active and storage rolls of wrapping material, the roll carrier having first and second pivot points, the pivot points affixed to the baler on a common first horizontal axis, the respective second pivot points pivotably affixed to the respective sides of the roll carrier on a common second horizontal axis.

9. A method of self-threading a bale wrapping material from a roll through a bale wrapping mechanism, comprising the steps of:
   providing an active roll of bale wrapping material in a first location and feeding it along a predetermined path through the bale wrapping mechanism;
   providing a storage roll of bale wrapping material in a second location parallel to the first active roll;
   observing the active roll to determine when it is nearly exhausted of wrapping material, and, when that condition is observed:
   moving the storage roll from the second location to the first location into contact with the bale wrapping material along the predetermined path into the same first location previously occupied by the active roll, so that the wrapping material on the storage roll adheres to and follows the wrapping material from the active roll being fed along the predetermined path;
   moving the active roll in coordination with the movement of the storage roll from the first location to the second location and the active roll continuing to dispense wrapping material along the predetermined path upon reaching the second location previously occupied by the storage roll.

* * * * *